United States Patent [19]
Slaton et al.

[11] 3,976,968
[45] Aug. 24, 1976

[54] UNDERWATER TARGET DETECTION APPARATUS

[75] Inventors: Jack H. Slaton, Pasadena; Halley Wolfe, La Canada, both of Calif.

[73] Assignee: The United States of America as represented by the Secretary of the Navy, Washington, D.C.

[22] Filed: Nov. 19, 1954

[21] Appl. No.: 470,142

[52] U.S. Cl. .................................... 340/3 D
[51] Int. Cl.² ................................. G01S 9/66
[58] Field of Search .......... 340/3, 3 D; 114/21; 343/7.7

[56] References Cited
UNITED STATES PATENTS

| | | | |
|---|---|---|---|
| 2,431,854 | 12/1947 | Wood | 340/3 |
| 2,566,858 | 9/1951 | Sebring | 340/3 |
| 2,572,116 | 10/1951 | Daly | 114/21 |
| 2,583,531 | 1/1952 | Hathaway | 340/3 |
| 2,621,243 | 12/1952 | Sunstein | 340/3 |
| 2,678,440 | 5/1954 | Watt | 343/7.7 |

*Primary Examiner*—Richard A. Farley
*Attorney, Agent, or Firm*—Richard S. Sciascia; Ervin F. Johnston

EXEMPLARY CLAIM

3. An underwater moving-target detection system comprising, in combination, means for generating and projecting acoustic energy at an adjustable carrier frequency as generated, means for receiving resultant reflected acoustic energy including water reverberation, false-target echoes at substantially reverberation frequency, and moving-target echoes at differing frequencies, means responsive to said received reverberation and adapted to readjust said generated carrier frequency to such value that the frequency of resultant reverberation, as received, is substantially of predetermined fixed value, and coincidence circuit means for enabling utilization of only such said echoes which as received exhibit frequencies differing from said predetermined fixed value of frequency by more than a target-doppler threshold value.

8 Claims, 4 Drawing Figures

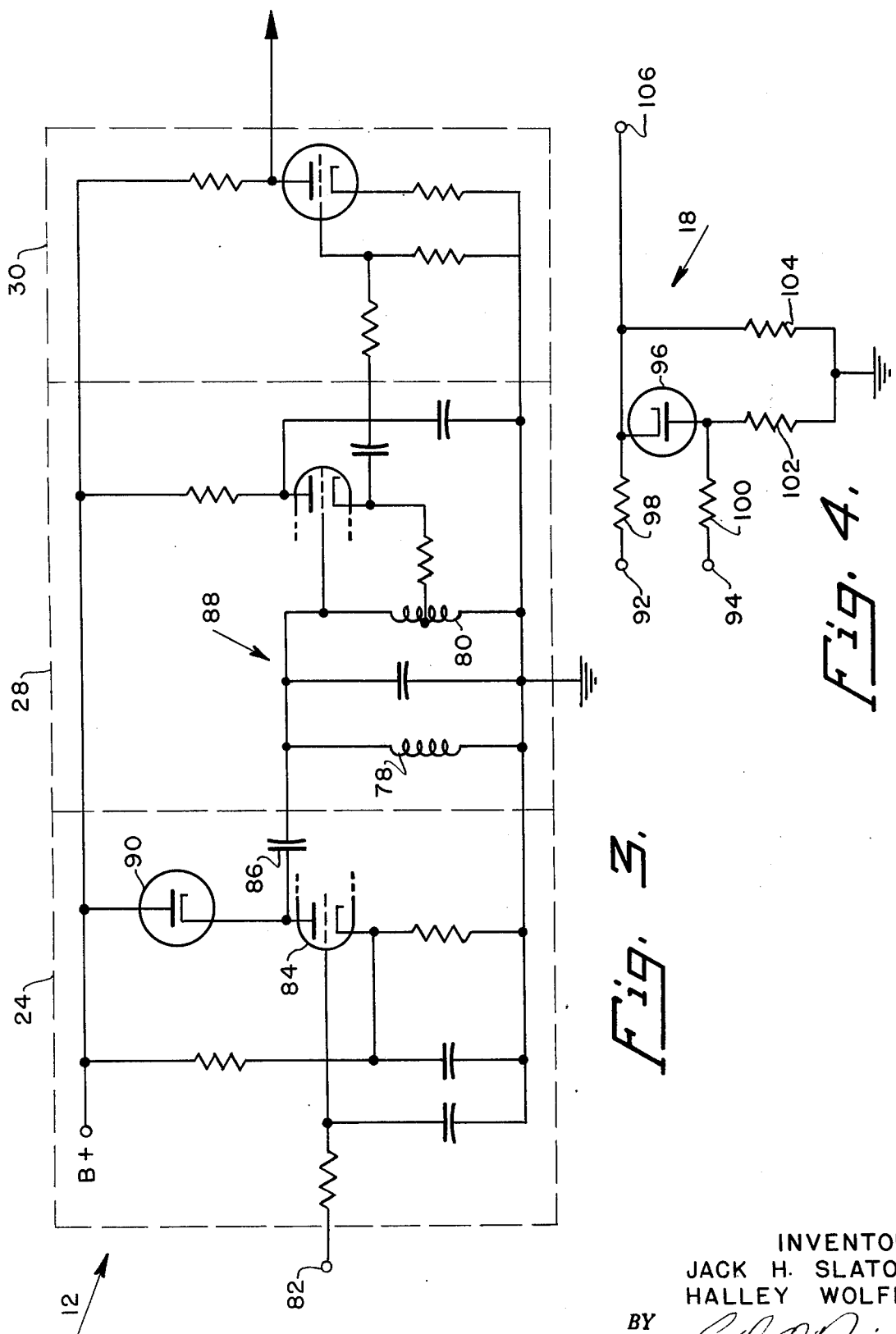

UNDERWATER TARGET DETECTION APPARATUS

The invention described herein may be manufactured and used by or for the government of the United States of America for governmental purposes without the payment of any royalties thereon or therefor.

This invention relates to underwater target detection apparatus and in particular to an improved pulsed active acoustic guidance system for a torpedo. A pulsed active acoustic guidance system is one which periodically transmits a short pulse of acoustic energy and then listens for acoustic energy from the transmitted pulse which is reflected from a target. From the reflected acoustic energy, or echo, received from the target the direction of the object or target which reflected the transmitted energy with respect to the transmitter can be determined.

The transmitted acoustic energy is formed into a beam, the axis of which normally coincides with the longitudinal axis of the torpedo in which the system is adapted to be mounted. A large portion of the acoustic energy received by the system during the listening period is due to reverberation, reflection of the transmitted acoustic energy from the myriads of discontinuities found in the sea. The center frequency of the reverberation is the frequency of the transmitted acoustic energy plus the Doppler shift due to the speed of the torpedo in the sea. The magnitude of the reverberation is at a maximum at the end of the transmitted pulse and decays with time thereafter. The frequency of the echo from a non-moving object in the sea will be substantially the same as the center frequency of the reverberation, but the echo from a moving target will in general differ markedly in frequency from that of reverberation. The amplitude of the received echo decreases with range, being large when the echo source is nearest the torpedo and small when the echo source is at the maximum range at which the system can detect a target. The presence of reverberation ordinarily requires that the received echo from a target be larger in amplitude than the reverberation at the time the echo is received in order for the system to distinguish the echo, out moving-target detection systems avoid such difficulty basically by utilizing the differing doppler frequency shift exhibited by moving-target echoes.

Large echoes can also result from reflection of the transmitted acoustic energy from the surface and bottom of the sea, and from discontinuities in the density of the sea water due to temperature gradients and salinity gradients, for example. The presence of echoes from these discontinuities ordinarily makes it difficult to identify the echo from the desired target, but in moving-target detection systems such spurious echoes are in effect ignored by means of coincidence circuits as described herein.

If a target has a component of velocity toward or away from the torpedo, the frequency of the echo from the target will differ from the center frequency of the reverberation by an amount which is a function of the magnitude of this component. This frequency difference is known as target-doppler, the Doppler shift of the moving-target echo relative to reverberation frequency. Such frequency shift exhibited by an echo in moving-target detection systems is in effect used to identify that echo as being from the target.

Active acoustic torpedoes of the type here under consideration are initially controlled by such conventional means as gyroscopes and pressure responsive devices to follow a prescribed course, until the guidance system detects and in effect identifies an echo as being from a target by utilization of the target-doppler characteristic. When such an echo is so identified, "enables" circuitry functions to place the azimuth and depth steering means of the torpedo, under the control of steering signals derived from the echo by the guidance system, provided the echo exceeds both an amplitude and a Doppler threshold. Such an arrangement prevents the guidance system from enabling on spurious echoes, for example those received from the surface and the bottom of the sea under certain conditions.

Active acoustic guidance systems of moving-target detection type have heretofore been designed to employ a transmitter comprising a frequency-control oscillator operating at fixed frequency, and a receiver having not only a signal channel which derives steering command signals but also a separate doppler-enabler channel to which received reverberation and echoes are applied. The latter channel comprises a heterodyning circuit (including a mixer, local oscillator, intermediate frequency amplifier, discriminator and reactance tube circuit) arranged and adapted to periodically sample reverberation, to "follow" reverberation frequency, and to yield a recognition pulse (for application to a coincidence of enabling circuit) upon receipt of an echo differing sufficiently in frequency from the center-frequency of reverberation. The present invention eliminates the above described heterodyning doppler-enabler channel, accomplishing the same end result of discriminating moving-target echoes from reverberation and spurious echoes, and of enabling the guidance system in response only to true target echoes, by means of a novel circuit combination in which a discriminator, operating at signal frequency rather than at heterodyned intermediate frequency, functions to continuously correct the transmission frequency to values which force the frequency of reverberation and of spurious echoes as received to substantially the constant and predetermined center-frequency of the discriminator.

It is therefore an object of this invention to provide an improved active acoustic guidance system.

It is a further object of this invention to provide an improved active acoustic guidance system which produces a signal for enabling the system when an echo is received which exceeds both an amplitude and a Doppler threshold.

It is a still further object of the invention to provide an improved active acoustic guidance system of a torpedo which enables only when an echo is received from a target having a component of velocity greater than a predetermined minimum along the course of the torpedo.

It is a still further object of this invention to provide an active acoustic guidance system which requies a minimum number of components.

Other objects and many of the attendant advantages of this invention will be readily appreciated as the same become better understood by reference to the following detailed description when considered in connection with the accompanying drawing wherein:

FIG. 3 is a schematic diagram of the reactance tube, oscillator and buffer amplifier of the transmitter, and FIG. 4 is a schematic diagram of the coincidence circuit for enablement of the guidance system in response only to moving target echoes.

Figure 1:
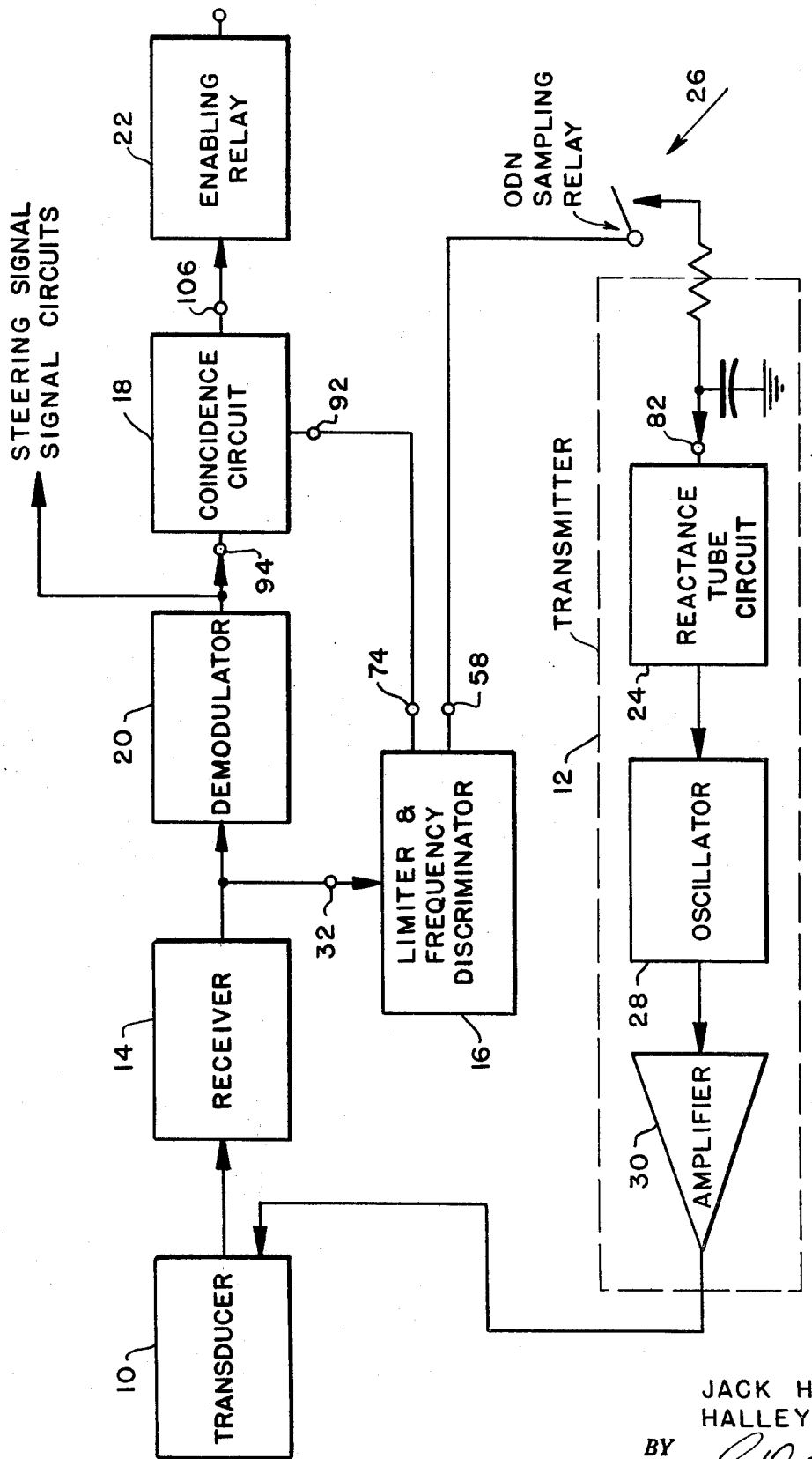
FIG. 1 is a block diagram of the invention.

Referring now to FIG. 1, transmitting and receiving transducer 10 is periodically energized by conventional pulsing means (not shown) associated with transmitter 12 to produce short pulses of transmitted acoustic energy. In a preferred example, transducer 10 is a four segment transducer which is energized for 30 milliseconds every 1¼ seconds. During the listening period which commences at the end of each transmitted pulse and ends when the next pulse is transmitted, acoustic energy incident on transducer 10 is converted into equivalent electrical signals which are applied to receiver 14. Receiver 14 preferably comprises a phase to amplitude converter and a switching amplifier (for example as described in copending application Ser. No. 305,432 entitled "Echo-Ranging Torpedo", filed 20 Aug. 1952, by Harvey Brooks et al), such that the signal out of receiver 14 is amplitude modulated in accordance with the bearing, or bath bearing and elevation; of the target with respect to the torpedo. However, the operation and construction of the transducer and receiver may be entirely conventional and details thereon form no part of this invention. The output of receiver 14 is applied to frequency discriminator 16, and to coincidence circuit 18 through demodulator 20 which isolates the modulation signal carrying steering information. The modulation signal delivered by demodulator 20 is also applied to steering signal detector circuits whose outputs control the azimuth and depth steering means of the torpedo to steer the torpedo to the target when enabling relay 22 is energized. The steering signal detector circuits and the means for controlling the depth and azimuth steering means of a torpedo are conventional and do not form a part of this invention, and therefore have not been illustrated and described in detail. Discriminator 16 produces two output voltages, one is applied to coincidence circuit 18 and the other is applied to reactance tube circuit 24 through the own Doppler nullification sampling relay 26, hereinafter referred to as the ODN relay. Reactance tube circuit 24 controls the frequency of oscillator 28 in transmitter, 2. The output of oscillator 28 is applied to buffer amplifier 30 to energize transducer 10 at suitable level. In a preferred example the center frequency of discriminator 16 was chosen as 60 kilocycles per second. One output of discriminator 16 is connected to reactance tube circuit 24 for a period of 50 milliseconds at the end of each transmitted pulse to correct the frequency of oscillator 28 so that the frequency of the transmitted pulses are shifted, during the course of a few pulses or cycles of transmitted pulses and listening periods, until the center frequency of the reverberation is the same as the center frequency of the discriminator.

If the speed of the torpedo and the frequency of the transmitted pulse are known and constant, it is possible to calculate the magnitude of the Doppler shift and thus the center frequency of the reverberation. However, in practice the average reverberation center frequency differs from that which is predicted, due to variations in the speed of the torpedo, or variations in the average reverberation frequency even at constant speed due to anomalies in the speed of sound in the sea. The variations in the center frequency of the reverberation due to these causes occur slowly. The feed back loop provides for own Doppler nullification by compensating for these variations.

After a few transmitted pulses the frequency of oscillator 28 is such that the center frequency of the reverberation is centered at the center frequency of discriminator 16. When an echo is received whose frequency differs from that of the center frequency of the reverberation, discriminator 16 produces a pulse which is applied to coincidence circuit 18. If simultaneously receiver 14 through demodulator 20 applies a pulse to coincidence circuit 18, a negative pulse is then applied from coincidence circuit 18 to the enabling relay 22. If the amplitude of the negative pulse is above a predetermined value, relay 22 is energized which in turn enables the guidance system by connecting the detected output of demodulator 20 to the steering means of the torpedo.

Figure 2:
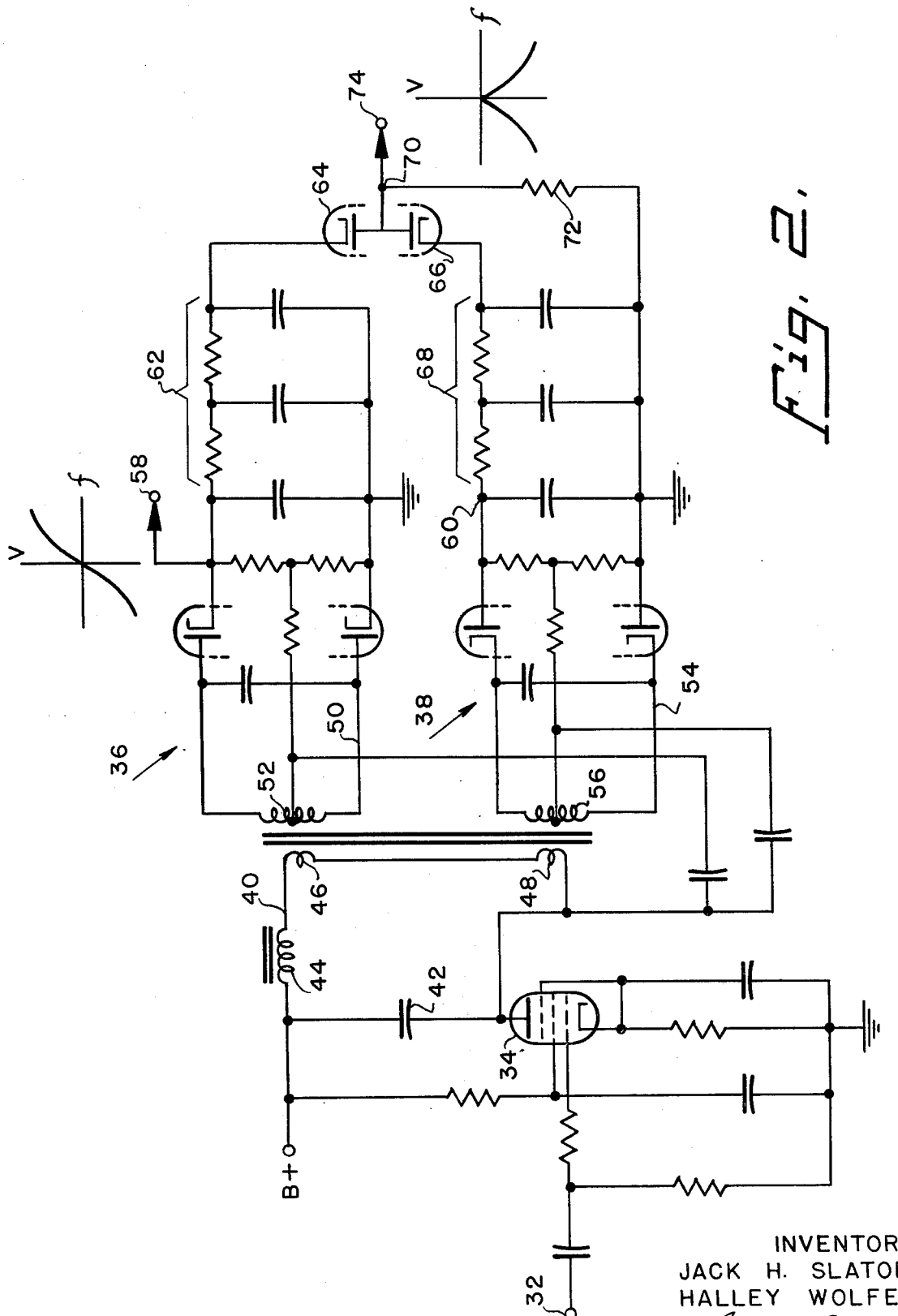
FIG. 2 is a schematic diagram of the limiter and frequency discriminator.

Discriminator 16 must provide a usably large output voltage for rather small deviations from its center frequency and must provide two different types of outputs. FIG. 2 is a schematic diagram of such a discriminator. It is usually desirable to provide for enabling when the target speeds are equal to, or greater, than 1 to 1.5 knots toward or away from the torpedo. In a 60 kilocycle system this requires the discriminator to produce a large output for a 40 to 60 cycle per second deviation from its center frequency. The voltage applied from the discriminator to reactance tube circuit 24 should be a linear function of the deviation, that is, positive for frequencies above the discriminator's center frequency and negative for frequencies below the center frequency. The voltage applied to coincidence circuit 18 in the preferred example must be negative for both directions of frequency deviation with a zero voltage when the center frequency of the reverberation is the same as the center frequency of the discriminator. The input signal from receiver 14 is applied to input terminal 32. The signal is amplitude limited by the circuit which includes tube 34. It is, of course, possible to provide additional stages of limitation before that provided by tube 34 if so desired. Limitation of the signal is necessary to lower the limiting threshold so that amplitude modulated signals applied to terminal 32 from receiver 14 will not reduce the sensitivity of discriminator 16 to an objectionable degree.

Discriminator 16 is a modified Foster-Seeley circuit having two channels 36, 38 operating in parallel. The common primary parallel resonant circuit 40 comprises capacitor 42, inductor 44 and coupling windings 46, 48. Inductor 44 has a separate core from that of coupling windings 46, 48. The inductance of inductor 44 is much larger than the inductance of coupling windings 46, 48. The secondary parallel resonant circuit 50 of channel 36 has secondary winding 52 inductively coupled with winding 46 of circuit 40, and secondary parallel resonant circuit 54 of channel 38 has secondary winding 56 inductively coupled with winding 48 of circuit 40. Circuits 50 and 54 are sharply tuned to the center frequency of the discriminator. Resonant circuit 40 is broadly tuned to the center frequency. The components of channel 36 are arranged so that the potential of output terminal 58 is positive for frequencies above the center frequency of the discriminator and negative for frequencies below the center frequency. Channel 38 is arranged so that the potential at point 60 is positive for frequencies below the center frequency of the discriminator and negative for frequencies above the center frequency. Terminal 58 of channel 36 is connected through low pass filter 62 to the cathode of diode 63, point 60 is connected to the cathode of diode 66 through low pass filter 68. The plates of tubes 64, 66 are connected together at point 70. Resistor 72 is connected between point 70 and ground. The circuit including diodes 64, 66 and resistor 72 forms a phase perverter. The second output voltage of the discriminator obtained at terminal 74 is zero when the input signal at terminal 32 is at the center frequency of the discriminator and negative when the frequency of the input signal deviates in either direction from the center frequency of the discriminator.

Since the voltage at terminal 74 must provide zero voltage at the center frequency of the discriminator, it is necessary that the voltages at terminal 58 and point 60 must both be zero when the frequency of the input signal is at the center frequency of the discriminator. This is insured by carefully balancing the voltages obtained from the two ends of windings 52 and 56.

The amplifier oscillator and reactance tube circuits are shown schematically in FIG. 3. Oscillator 28 is a Hartley circuit employing a large inductor 78 in parallel with small inductor 80 to make possible a very accurate initial frequency adjustment. Turns are removed from the small inductor 80 to obtain the approximate frequency desired and then from the high inductor 78 to obtain the exact value.

Variation of the frequency of oscillator 28 is obtained by using the d.c. grid voltage obtained from terminal 58 of discriminator 16 which is applied to the input terminal 82 to vary the plate resistance of reactance tube 84. Variation in the plate resistance of tube 84 causes the capacitance of capacitor 86 connected to the parallel resonant circuit 88 to appear more or less capacitative depending upon the impedance from capacitor 86 to ground through tube 84. Diode 90, in the plate circuit of tube 84, presents a high a.c. impedance but does not appreciably shunt the plate resistance of tube 84. Triode amplifier 30 is used for buffer amplifier purposes, to provide a sufficient output signal level without undesirable variable loading and resultant frequency disturbance during pulsed operation of the transmitter as described.

The coincidence circuit 18, see FIG. 4, has two input terminals 92, 94. Terminal 92 is connected to terminal 70 of discriminator 16, and terminal 94 is connected to the output of demodulator 20. Terminal 92 is connected to the cathode of diode 96 through resistor 98. Terminal 94 is connected to the plate of diode 96 through resistor 100. The plate of diode 96 is connected to ground through resistor 102. Tube 96 and resistor 102 are shunted by resistor 104. Resistor 98 is much larger than resistor 102. The presence of a negative pulse at one or the other of input terminals 92, 94 will produce no change in potential of output terminal 106 of coincidence circuit 18. However, if negative pulses are applied to terminals 92, 94 at the same time, circuit 18 will produce a negative pulse at terminal 106. If this pulse is above a certain predetermined value, enabling relay 22 is energized and enables the guidance system.

Transducer 10, receiver 14, demodulator 20 and enabling relay 22 have been illustrated in block form since such components are well known and familiar to those skilled in the underwater acoustic art.

Obviously many modifications and variations of the present invention are possible in the light of the above teachings. It is, therefore, to be understood that within the scope of the appended claims the invention may be practiced otherwise then as specifically described.

What is claimed is:

1. In an active acoustic underwater target detection system, in combination: means for periodically transmitting pulses of acoustic energy, means for receiving reflected acoustic energy including reverberation and echo-pulses, means for automatically adjusting the carrier frequency of the transmitted pulses so that the frequency of the resultant reverberation as received has a predetermined fixed value, means for producing a first electrical signal when a reflected echo-pulse is received whose frequency differs from said predetermined fixed value, means for producing a second electrical signal when a reflected echo-pulse is received whose amplitude is above a predetermined magnitude, a coincidence circuit for producing a signal when said first and second signals occur simultaneously, and relay means controlled by the signal produced by said coincidence circuit.

2. Target detection and enabler apparatus for an active acoustic guidance system of a torpedo having also azimuth and depth steering means, comprising in combination: a transducer, transmitter means for periodically energizing the transducer to project a pulse of acoustic energy, a receiver for producing electrical signals corresponding to resultant reverberation and echo-pulses, a discriminator circuit connected to the receiver for producing first and second discriminator signals, a reactance tube circuit for adjusting the frequency of the transmitted pulse, the first discriminator signal being adapted and applied to the reactance tube circuit to adjust the frequency of the transmitted pulse so that the frequency of the resultant reverberation as received is substantially the same as the center frequency of the discriminator, a demodulator connected to the receiver for demodulating said echo-pulse signals, a coincidence circuit, the second discriminator signals and the demodulated echo-pulse signals being applied to the coincidence circuit, said coincidence circuit adapted to produce therefrom a relay-energizing signal if the demodulated and second discriminator signals exceed predetermined minimum values and occur simultaneously, and an enabling relay connected to the coincidence circuit and energized by the coincidence circuit output signal for enabling the guidance system to assume control of the azimuth and depth steering means of the torpedo if the amplitude of the said output signal exceeds a predetermined value.

3. An underwater moving-target detection system comprising, in combination, means for generating and projecting acoustic energy at an adjustable carrier frequency as generated, means for receiving resultant reflected acoustic energy including water reverberation, false-target echoes at substantially reverberation frequency, and moving-target echoes at differing frequencies, means responsive to said received reverberation and adapted to readjust said generated carrier frequency to such value that the frequency of resultant reverberation, is received, is substantially of predetermined fixed value, and coincidence circuit means for enabling utilization of only such said echoes which as received exhibit frequencies differing from said predetermined fixed value of frequency by more than a target-doppler threshold value.

4. An underwater moving-target detection system for use in a propulsive craft, said system comprising, in combination, means for generating and projecting acoustic pulses adjustable in carrier frequency as generated, means for receiving resultant reflected acoustic energy including water reverberation, false-target echoes at substantially reverberation frequency, and moving-target echoes at differing frequencies, means responsive to said received reverberation and adapted to readjust said generated carrier frequency to such value that the frequency of resultant reverberation, as received, is substantially of fixed value, means for deriving, from said echoes, control signals having characteristics defining and varying in accordance with the direction from which the echoes arrive, and coincidence circuit means for enabling utilization of only such said control signals as are derived from echoes which as received exhibit frequencies differing from said predetermined fixed value of frequency by more than a target-doppler threshold value.

5. An underwater moving-target detection system for use in a propulsive craft, said system comprising, in combination, means for generating and projecting acoustic pulses adjustable in carrier frequency as generated, means for receiving resultant reflected acoustic energy including water reverberation, false-target echoes at substantially reverberation frequency, and moving-target echoes at differing frequencies, means responsive to said received reverberation and adapted to readjust said generated carrier frequency to such value that the frequency of resultant reverberation, as received, is substantially of predetermined fixed value, means for deriving, from said echoes, control signals having characteristics defining and varying in accordance with the directions from which the echoes arrive, and means for enabling utilization of only such said control signals as are derived from echoes having greater than predetermined amplitude and which as received exhibit frequencies differing from said predetermined fixed value of frequency by more than a target-doppler threshold value.

6. An underwater moving-target detection system for use in a propulsive craft, said system comprising, in combination, means for generating and projecting acoustic pulses adjustable in carrier frequency as generated, means for receiving resultant reflected acoustic energy including water reverberation, false-target echoes at substantially reverberation frequency, and moving-target echoes at differing frequencies, means for sampling said received reverberation, means responsive to said sampled reverberation and adapted to readjust said generated carrier frequency to such value that the frequency of resultant reverberation, as received, is substantially of predetermined fixed value, means for deriving, from said echoes, control signals having characteristics defining and varying in accordance with the direction from which the echoes arrive, and means for enabling utilization of only such said control signals as are derived from echoes having greater than predetermined amplitude and which as received exhibit frequencies differing from said predetermined fixed value of frequency by more than a target-doppler threshold value.

7. An underwater moving-target detection system for use in a propulsive craft, said system comprising, in combination, means for generating and repetitively projecting acoustic pulses adjustable in carrier frequency as generated; means for receiving resultant reflected acoustic energy including water reverberation, false-target echoes at substantially reverberation frequency, and moving-target echoes at differing frequencies; frequency discriminator means for converting said received acoustic energy to first and second discriminator signals, said first signal varying in both sense and magnitude, said second signal varying only in magnitude, in accordance with the frequency deviation of said received acoustic energy relative to a predetermined center-frequency; means for sampling said first discriminator signal immediately after projection of each acoustic pulse; means responsive to said sampled first discriminator signal and adapted to readjust said generated carrier frequency to such value that the frequency of resultant reverberation, as received, is substantially of predetermined fixed value; means for deriving, from said echoes, control signals having characteristics defining and varying in accordance with the direction from which the echoes arrive; control signal utilization circuits; an enabling relay adapted, when energized, to apply said control signals to the utilization circuits; demodulating means for converting received echoes to d-c pulses of corresponding amplitude; and coincidence circuit means having applied thereto said d-c pulses and said second discriminator signal and adapted to energize said enabling relay only when one of said d-c pulses exceeds a predetermined amplitude threshold and occurs in time coincidence with a second discriminator signal which exceeds another predetermined amplitude threshold.

8. An active-acoustic homing torpedo system comprising, in combination, means for generating and repetitively projecting acoustic pulses adjustable in carrier frequency as generated; means for receiving resultant reflected acoustic energy including water reverberation, false-target echoes at substantially reverberation frequency, and moving-target echoes at differing frequencies; frequency discriminator means for converting said received acoustic energy to first and second discriminator signals, said first signal varying in both sense and magnitude, said second signal varying only in magnitude, in accordance with the frequency deviation of said received acoustic energy relative to a predetermined center-frequency; means for sampling said first discriminator signal immediately after projection of each acoustic pulse; means responsive to said sampled first discriminator signal and adapted to readjust said generated carrier frequency to such value that the frequency of resultant reverberation, as received, is substantially of predetermined fixed value; means for deriving, from said echoes, steering control signals having characteristics defining and varying in accordance with the direction from which the echoes arrive; course and depth torpedo steering control circuits; an enabling relay adapted, when energized, to apply said steering control signals to the torpedo steering control circuits; demodulating means for converting received echoes to d-c pulses of corresponding amplitude; and coincidence circuit means having applied thereto said d-c pulses and said second discriminator signal and adapted to energize said enabling relay only when one of said d-c pulses exceeds a predetermined amplitude threshold and occurs in time coincidence with a second discriminator signal which exceeds another predetermined amplitude threshold.

\* \* \* \* \*